United States Patent
Cammisa et al.

(10) Patent No.: US 10,547,597 B2
(45) Date of Patent: Jan. 28, 2020

(54) SECURE NETWORK CONNECTIONS

(71) Applicant: International Business Machines Corporation, Armonk, NY (US)

(72) Inventors: Maximiliano Cammisa, Rome (IT); Antonio Di Cocco, Rome (IT); Marco Imperia, Rome (IT); Paolo Ottaviano, Rome (IT); Gianluca Perreca, Rome (IT)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/414,140

(22) Filed: Jan. 24, 2017

(65) Prior Publication Data
US 2018/0212930 A1    Jul. 26, 2018

(51) Int. Cl.
*H04L 29/06* (2006.01)

(52) U.S. Cl.
CPC ...... *H04L 63/0471* (2013.01); *H04L 63/0272* (2013.01); *H04L 63/0281* (2013.01); *H04L 63/0464* (2013.01); *H04L 63/08* (2013.01)

(58) Field of Classification Search
CPC .................. H04L 63/0464; H04L 63/0471
See application file for complete search history.

(56) References Cited

U.S. PATENT DOCUMENTS

| | | | | |
|---|---|---|---|---|
| 6,675,193 B1 * | 1/2004 | Slavin | ............. | H04L 29/06 709/200 |
| 8,327,128 B1 * | 12/2012 | Prince | ............. | H04L 63/0823 713/150 |
| 8,498,295 B1 * | 7/2013 | Saxena | ............. | H04L 12/56 370/392 |
| 9,137,131 B1 * | 9/2015 | Sarukkai | ............. | H04L 43/0876 |
| 9,467,424 B2 * | 10/2016 | Gluck | ............. | H04L 63/0281 |
| 2005/0177722 A1 * | 8/2005 | Vaarala | ............. | H04L 63/02 713/168 |
| 2006/0120374 A1 * | 6/2006 | Yoshimoto | ............. | H04L 12/2856 370/392 |
| 2006/0242305 A1 | 10/2006 | Alnas | | |
| 2008/0183825 A1 * | 7/2008 | Alicherry | ............. | H04L 12/12 709/206 |
| 2010/0118869 A1 * | 5/2010 | Li | ............. | H04L 29/12066 370/389 |

(Continued)

FOREIGN PATENT DOCUMENTS

TW    1477115 B    3/2015

*Primary Examiner* — James R Turchen
(74) *Attorney, Agent, or Firm* — Schmeiser, Olsen & Watts, LLP; William Hartwell

(57) ABSTRACT

A method and associated system for connecting a computing device to a computing arrangement. A message from the computing device is received. The message includes an address specifying the computing arrangement. The proxy system is a computer system. It is determined, based on the address, that a secure connection between the proxy system and the computing arrangement does not exist. The secure connection is dedicated for secure communication between the computing device and the computing arrangement. In response to the determining that the secure connection does not exist, a new secure connection is established between the proxy system and the computing arrangement.

17 Claims, 5 Drawing Sheets

(56) References Cited

U.S. PATENT DOCUMENTS

| | | | |
|---|---|---|---|
| 2011/0096732 A1* | 4/2011 | Rashid | H04L 47/10 370/329 |
| 2012/0131208 A1 | 5/2012 | Kumar et al. | |
| 2014/0018037 A1* | 1/2014 | Shanmugavadivel | H04W 48/18 455/411 |
| 2014/0101317 A1 | 4/2014 | Yoon | |
| 2014/0208393 A1* | 7/2014 | Yasukawa | H04L 29/12509 726/4 |
| 2014/0237539 A1* | 8/2014 | Wing | H04L 63/08 726/1 |
| 2014/0331297 A1* | 11/2014 | Innes | H04L 63/08 726/7 |
| 2015/0052599 A1 | 2/2015 | Champagne et al. | |
| 2015/0288514 A1* | 10/2015 | Pahl | H04L 9/085 713/171 |
| 2016/0226831 A1* | 8/2016 | Kim | H04L 63/062 |
| 2018/0048622 A1* | 2/2018 | Gaitatzis | H04L 63/029 |
| 2019/0052603 A1* | 2/2019 | Wu | H04W 12/06 |
| 2019/0104442 A1* | 4/2019 | Witzel | G06F 9/45558 |
| 2019/0146849 A1* | 5/2019 | Leonard | G06F 9/5072 718/104 |

* cited by examiner

SECURE NETWORK CONNECTIONS

TECHNICAL FIELD

The present invention relates to the field of digital computer systems, and more specifically, to connecting a computing device to a computing arrangement.

BACKGROUND

Connections between a client and a remote computing arrangement such as a cloud center are made over public networks. The number of connections is scaling with the increasing size of the computing systems. Therefore, there is an increasing need of efficient methods and systems to manage such increasing number of connections.

SUMMARY

Embodiments of the present invention provide a method, and associated computer system and computer program product, for connecting a computing device to a computing arrangement. One or more processors of proxy system receive a message from the computing device, said message comprising an address specifying the computing arrangement, said proxy system being a computer system. The one or more processors determine, based on the address, that a secure connection between the proxy system and the computing arrangement does not exist. The secure connection is dedicated for secure communication between the computing device and the computing arrangement. In response to said determining that the secure connection does not exist, the one or more processors, establish a new secure connection between the proxy system and the computing arrangement.

BRIEF DESCRIPTION OF THE DRAWINGS

In the following embodiments of the invention are explained in greater detail, by way of example only, making reference to the drawings.

DETAILED DESCRIPTION

Figure 1:
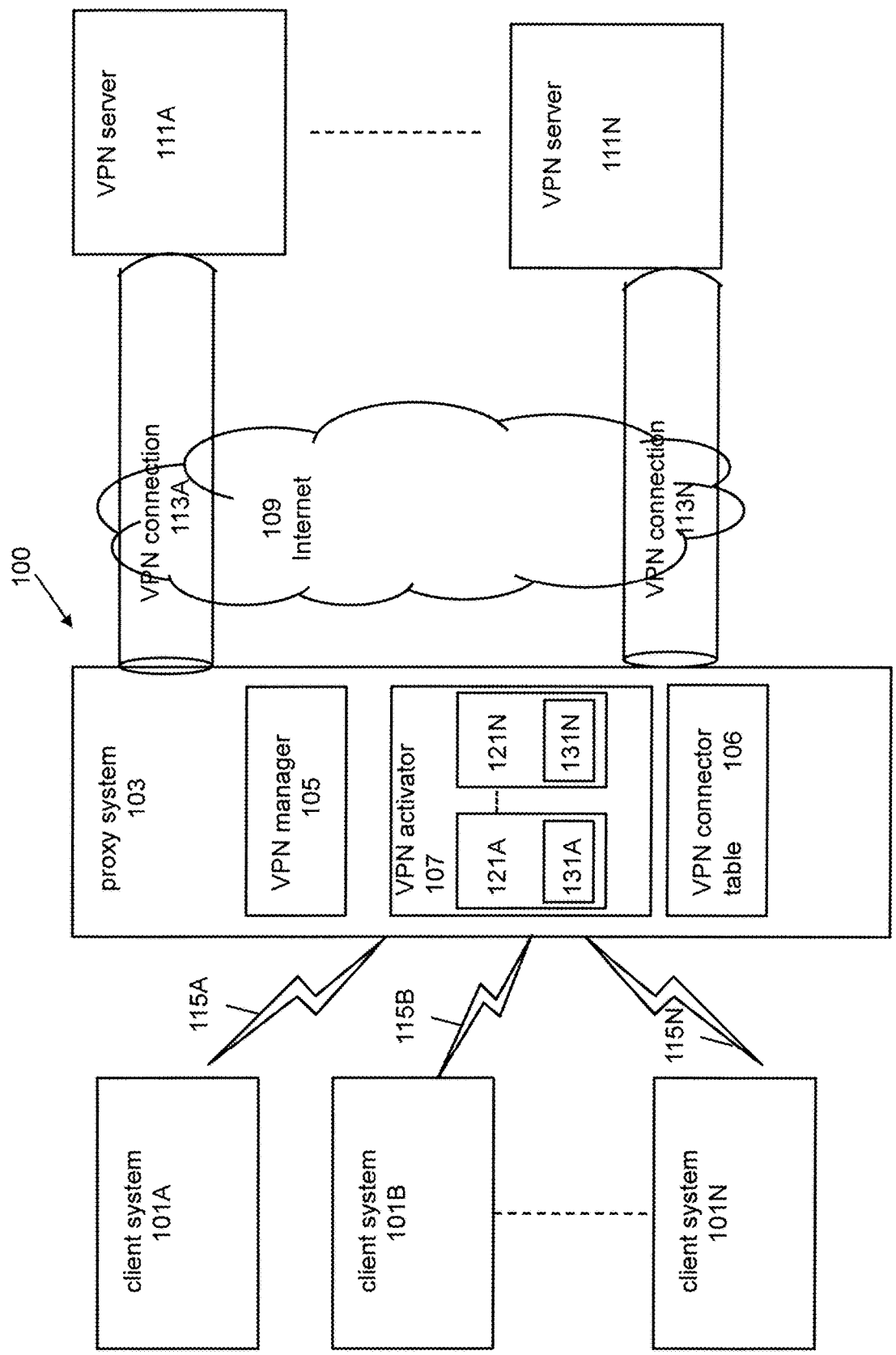
FIG. 1 is a block diagram of a system for connecting a computing device to a computing arrangement, in accordance with embodiments of the present invention.

Embodiments of the present disclosure provide a system and method to manage multiple segregated environments activating and deactivating multiple secure connection sessions such as VPN sessions. The proxy system may be able to automatically determine if a connection is required and if the connection is not yet available, start the connection. The proxy system may be created to work as a network proxy so that the computing devices (or client systems) can be connected to segregated environments through the proxy system. A segregated environment may comprise the computing arrangement. For example, within the proxy system a VPN may dynamically be created and/or destroyed against the remote segregated environment.

The proxy system may be connected to the computing device via a normal connection (e.g., a connection not requiring an encryption of the communication between the proxy system and the computing device) or via a secure connection over a first network. The proxy system may be connected to the computing arrangement via a second network. The data may be communicated between the computing device and the computing arrangement via the two connections (e.g., the normal and secure connections) connecting the proxy system to the computing device and to the computing arrangement respectively.

For example, the first and second networks may be different. The second network may be a public network that may be an insecure network. The public network may be the Internet, or other large area or widely accessible network, e.g., wide area network (WAN). The first network may be a proprietary computer network such as a local area network (LAN), or intranet. For example, computing devices connected to the first network may be assigned network addresses unique to the first network which may render the first network a secure network. The first network may be a secure network having access limited to authorized users. An authorized user may gain access to the first network using a sign-on procedure or protocol. The sign-on procedure may include security procedures such as entering a user id and a password, etc. Since the first network may be a secure network, the communication between the computing device and the proxy system may be secure, even if the connection between the computing device and the proxy system is not a secure connection; e.g., using encryption.

In another example, the first and second networks may be the same network or may both be insecure networks. The connection between the computing device and the proxy system may be a secure connection; e.g., a VPN connection.

The term "computing device" refers to a device with computing capability that is able to transmit or access data from a computing arrangement. A computing device includes both portable computing devices and non-portable computing devices. A portable computing device is generally a device that can operate on a battery and transmit and receive data wirelessly. Examples of a portable computing device include: a laptop computer, a tablet computer, a personal digital assistant, a smart phone, and the like. A non-portable computing device is a desktop computer. The computing device may for example be a service requester such as a client system while the computing arrangement is a service provider such as a server or vice versa.

The term "computing arrangement" refers to a computing device. A computing arrangement may for example comprise a server providing services to client systems.

The term "secure connection" refers to a connection which uses end-to-end communication protocol from one end point (e.g., the proxy system) to the other end point of the connection (e.g., the computing arrangement), so that traffic between the two end points is securely protected from third parties (e.g., in public communication networks). The communication protocol may for example enable encryption by one or more security protocols to ensure the security of data flowing between the two end points. For example, an appropriate program may be installed on both of the two end points of the secure connection such that the program can encrypt and decrypt the information and thus enabling secure communication between the two end points. An end point may comprise the computing device, the computing arrangement, or the proxy system.

Establishing a secure connection between the proxy system and the computing arrangement may comprise a handshaking operation for exchanging configuration data between the proxy system and computing arrangement or for receiving configuration data at the proxy system and the computing arrangement, such that each of the proxy system and the computing arrangement may perform a configuration process using the configuration data, which results in the secure connection being established. In another example, the configuration data may be sent by one of the proxy system and the computing arrangement to the other one of the proxy system and the computing arrangement. The exchange or reception of configuration data may be performed in response to initiating (e.g., sending an invitation request to the other party with which the connection is to be performed) the secure connection establishment by one of the proxy system and the computing arrangement. The configuration data may for example comprise an encryption/decryption key, connection parameters such as address of the end points of the connection, etc.

Establishing a connection between the computing device and the computing arrangement may comprise establishing a connection between the computing device and the proxy system and establishing a secure connection between the proxy system and the computing arrangement. The computing device may exchange data with the computing arrangement through the proxy system using the two established connections.

A "virtual machine (VM)" refers to software that emulates a physical computing environment on a computing device upon which an operating system (OS) or program can be installed and run.

The computing device may communicate with the computing arrangement after establishing the secure connection between the proxy system and the computing arrangement and establishing a connection between the computing device and the proxy system. The connection between the computing device and the proxy system may or may not use secure data communication protocols; e.g., for encrypting data communicated between the proxy system and the computing device. The connection between the proxy system and the computing device may be a secure connection using encryption and the like or a normal connection. However, that connection between the proxy system and the computing device may be secured by the fact that the proxy system and the computing device are connected via a secure network. For example, the secure connection between the proxy system and the computing arrangement may be a VPN connection while the connection between the computing device and the proxy system may be a normal connection that is secured by the fact that the proxy system and the computing device are connected to a same intranet or same environment where the intrusion probability is much lower compared to a public network.

The message sent by the computing device may be a request to establish a secure connection with the computing arrangement. The request is transmitted to the proxy system. After the requested connection is enabled (e.g., established or an existing connection is used) the computing device can communicate with the computing arrangement through the established connection.

The present method may enable multiple client systems or computing devices to securely connect to a same computing arrangement using a same secure connection that is established between the proxy system and that same computing arrangement. Another advantage may be that the computing device may connect to multiple computing arrangements in a secure manner using the secure connections that are established between the proxy system and the multiple computing arrangements and the single connection that is connecting the computing device to the proxy system.

The present system and method may enable an automatic management of connections by establishing desired connections or disabling unused connections. A client system, not being aware of existing secure connections, may try to connect to a desired address by sending a request. The proxy system may intercept the request and, if a secure connection to the segregated environment of the desired address is not already available, may open a secure connection to the segregated environment of the desired address. The present method may enable having several connections established at same time.

According to one embodiment, the computing arrangement is a cloud component of a cloud infrastructure system. For example, the computing arrangement may be a software as a service (SaaS) platform, platform as a service (PaaS) platform or infrastructure as a service (IaaS) platform.

A cloud provider may provide services to different users that would have each user's virtual environment completely segregated from each other user's virtual environment. Environment segregation may be achieved using embodiments of the present invention, so that any given user can open the given user's personal virtual network using the given user's personal credential without affecting other connections, which may be particularly important in a Platform PaaS environment, where there could be hundred or thousands of different deployments managed by an operator's team, which may enable each team member to access each single system in each single environment so each team member may be able to open a secure connection to one or more desired areas (e.g., more areas may be accessed to make comparison or to verify).

According to one embodiment, establishing the new secure connection comprises instantiating a new virtualized computing resource, such as a container or a virtual Machine, and initiating the connection establishment by a protocol entity deployed within the virtualized computing resource.

The term "container" refers to a software container that is a virtual software object that encompasses all of the elements that are needed for an application to run within an operating system, which enables isolation of the container from one or more additional containers running within an operating system. In some examples, a container may include only a single application and any libraries or other dependent files (e.g., as opposed to a virtual machine, which may include an entire guest operating system). As such, an application included in the container may be managed by a host operating system external to the container. Examples of containers include, without limitation, warden, DOCKER containers and Let Me Contain That For You (LMCTFY) containers.

Using virtualized computing resources may enable an efficient management and usage of resources for a high number of connections to be managed.

According to one embodiment, the secure connection is a Virtual Private Network (VPN) connection. In another example, the secure connection may be a Secure Socket Layer (SSL) connection.

According to one embodiment, the proxy system comprises a storage arrangement for storing authorization credentials needed for establishing a new secure connection and wherein the proxy system is operable for retrieving the credentials of the client system from the storage arrangement for establishing the new secure connection, which may further increase the secure aspect of the present invention by enabling only authorized users to use the connections.

According to one embodiment, the proxy system is operable for retrieving authorization credentials from a remote storage arrangement during establishing the new secure connection, which may save resources that would otherwise be required for storing the credentials locally in the proxy system.

According to one embodiment, the secure connection is closed and/or the virtualized computing resource is disposed if no communication took place between the computing device and the computing arrangement during a predefined time out period. Closing a connection may comprise deleting the configuration data that is used to establish that connection, from the computing device and/or the computing arrangement.

In one example, the secure connection may be closed by removing any reference to that secure connection in the proxy system. In a further example, the computing device and the computing arrangement may receive requests from the proxy system to close the connection; e.g., by removing configuration data that are specific to the connection.

The disposed virtualized computing resource may be assigned to another connection, so that the resources may be efficiently used in the proxy system.

According to one embodiment, the message is a connection setup request whose destination is the computing arrangement.

According to one embodiment, the message is an Internet Protocol (IP) packet and/or a Hypertext Transfer Protocol (HTTP) request. According to one embodiment, the address is an IP address, a Universal Resource Locator (URL) or the like. These embodiments may be advantageous, since these embodiments may be seamlessly integrated in existing systems.

FIG. 1 is a block diagram of a system 100 for connecting a computing device to a computing arrangement, in accordance with embodiments of the present invention. System 100 shown in FIG. 1 comprises client systems 101A-N, a proxy system 103 and VPN servers 111A-N. In this example, the computing device described above may comprise a client system 101A of multiple client systems 101A-N and the computing arrangement may comprise a VPN server 111A of multiple VPN servers 111A-N.

Proxy system 103 may be a VPN enabled system. The client system 10A-N may be a laptop computer, a mobile smart phone, an electronic tablet (e.g., iPad®), etc. VPN servers 111A-N may implement an application or service that is accessed by one or more applications running on the client systems 101A-N. The VPN servers 111A-N are connected to a public insecure network 109, such as the Internet. The VPN servers 111A-N may be part of one or more data centers that are accessible through the network 109. The VPN servers 111A-N may for example form a cloud and may provide cloud services such as SaaS that are accessible by client systems 101A-N.

VPN servers 111A-N may interact with the proxy system 103 over the public network 109. The proxy system 103 has the capability to establish a secure connection with any one of the VPN servers 111A-N. For example, proxy system 103 may establish a secure connection with a server 111A (111N) of the VPN servers 111A-N, via a VPN session or VPN connection 113A (113N) for purposes of accessing secure resources of the server 111A (111N).

The client systems 101A-N may interact with proxy system 103 over a network (not shown) that is a secure network. For example, client systems 101A-N may connect to the proxy system 103 via connections 115A-N respectively. The secure network may be a network having access limited to authorized users. For example, the client systems 101A-N and the proxy system 103 may be authorized to access the secure network.

For example, in order to exchange data between client system 101N and the VPN server 111N, a connection 115N between client system 101N and proxy system 103 may be established and a VPN connection 113N between proxy system 103 and VPN server 111N may be established. The data may be exchanged through connection 115N and VPN connection 113N.

System 100 permits a client system 101A-N to communicate securely across the public network 109 in such a way that the public network operates as one or more private communications links between the client systems 101A-N and the VPN servers 111A-N via the proxy system 103.

The proxy system 103 comprises a VPN manager 105 that receives or intercepts VPN connection requests from client systems 101A-N. The VPN manager 105 may be configured to process VPN connection requests in accordance with embodiments of the present invention. The VPN manager 105 may control VPN activator 107 to establish requested connections. The VPN activator 107 may be a dynamic VPN activator which dynamically (e.g., in real time) establishes VPN connections between the proxy system 103 and the VPN servers and connections between the proxy system 103 and the client systems 101A-N. For each VPN connection to be established between the proxy system 103 and the VPN servers 111A-N, VPN activator 107 may create a VPN connector. VPN activator 107 may create a new VPN connector any time the new VPN connector is required, and reconfigure the proxy system 103 so that a connection is established between client system 101A-N and desired VPN server 111A-N via the proxy system 103 using the VPN connector. The VPN connector may be used to process the respective VPN connection independently of the other VPN connectors such that the VPN connector does not conflict with the other VPN connectors.

The VPN connector may for example be a software container or a virtual machine to enable a virtualized computing resource; e.g., by the partition of the hardware resources via apportioned and/or discrete containers or VMs.

VPN activator 107 is shown as containing multiple software containers (or VPN connectors) 121A-N. Each container 121A-N may comprise a respective application software 131A-N. The VPN activator 107 may for example use a container engine such as a docker in order to automate the deployment of applications 131A-N inside software containers 121A-N.

An application 131A-N can run in a software container 121A-N on a physical or virtual machine. For example, the virtual machine provides hardware virtualization and the software container provides operating system virtualization. The software container 121A-N may emulate an operating system environment having the operating system environment's own file system and namespace, for example.

An application 131A-N may comprise a protocol entity that establishes connections between the client systems 101A-N and the proxy system 103 and between the proxy system 103 and the VPN servers 111A-N in accordance with embodiments of the present invention.

For example, an application 131A-N may further comprise a credential supplier which provides information about a remote segregated environment into which a client system 101A-N is willing to connect via a VPN connection: user name, password, VPN server address, and any additional needed item (SSL certificates, ssh keys and others). Credential supplier can locally store information or can access a centralized system where information is stored, which may enable performing an authorization process to determine if the client system 101A-N, after being authenticated, is authorized to access the VPN server 111A-N based on the information contained in the access request sent by the client system 101A-N. In another example, the credential supplier may be configured to access a remote authentication server (not shown) and query the remote authentication server to perform authentication and authorization of the access request. In another example, the proxy system 103 and remote authentication server can both share the tasks of authentication and authorization.

In one example, VPN manager 105 may automatically monitor activities for each VPN connector 121A-N, and if any of the VPN connectors is not active, may automatically be destroyed by VPN activator 107. VPN manager 105 may take care of cleaning up unused VPN connectors; e.g., if a VPN connector is not used within a given time-out, then the VPN connector is removed and eventually reused later on. For monitoring the VPN connectors 121A-N, a VPN connector table 106 of the proxy system 103 may be accessible to and accessed by the VPN manager 105. A given VPN connector is an unused or not active VPN connector means that the VPN connection that is associated with (e.g., established by) the given VPN connector is an unused connection; e.g., unused during the time-out.

For example, VPN connector table 106 may contain state and connection information for all VPN connectors 121A-N. The state of a VPN connector may for example either be unitialized (inactive) or connected (active). The state of a VPN connector is set to connected after a client system 101A-N authenticates to the proxy system 103 via the credential supplier, and the connection between the client system and the VPN server is established via the proxy system. The state of a VPN connector is set to unitialized if no communication took place between the client system and the VPN server during a predefined time out period. In the latter case, the VPN connector may be deleted. The deleting of the VPN connector may comprise deleting the VPN connector or deactivating the VPN connector by disabling resources for the VPN connector. In case the VPN connector is deactivated, the associated VPN connection can be used without need of establishing a new VPN connection. For example, even if the VPN connector is deleted, information on that VPN connector and associated VPN connection may be maintained in the VPN connector table 106 such that the information can be used later on for (re)using the connection associated with the VPN connector without need of establishing a new connection. For example, the proxy system 103 may have access to network traffic to determine if for a given VPN connection 113A-N there is some traffic or not. The VPN connector may monitor the VPN connector's associated VPN connection 113A-N to determine the data traffic between the two end points of the VPN connection.

The information stored in the VPN connector table 106 may indicate for example the VPN connections 113A-N using s the address of the corresponding VPN server 111A-N and configuration data used to establish the VPN connections at the proxy system 103 and/or VPN server 111A-N. For example, VPN connector table 106 may comprise an entry indicating a VPN connector 121A and associated VPN connection 113A. In another example, the entry may further indicate connection 115A.

A "VPN session" refers to a successful VPN connection made by proxy system 103 to a VPN server 111A; e.g., after authentication is performed such that the user of the client system 101A has authenticated.

The system 100 may be advantageous by, for example, enabling client system 101A to connect to multiple VPN servers; e.g., VPN servers 111A and 111B using a single connection 115A to the proxy system 103 and VPN connections; e.g., 113A and 113B that connect the proxy system 103 to the VPN servers 111A-B respectively.

The system 100 may further enable client systems 101A-B to connect to a same VPN server; e.g., VPN server 111A using a single VPN connection 113A that connects the VPN server 111A to the proxy system 103 and connections 115A-B that connect the proxy system 103 to the clients systems 101A-B respectively.

Figure 2:
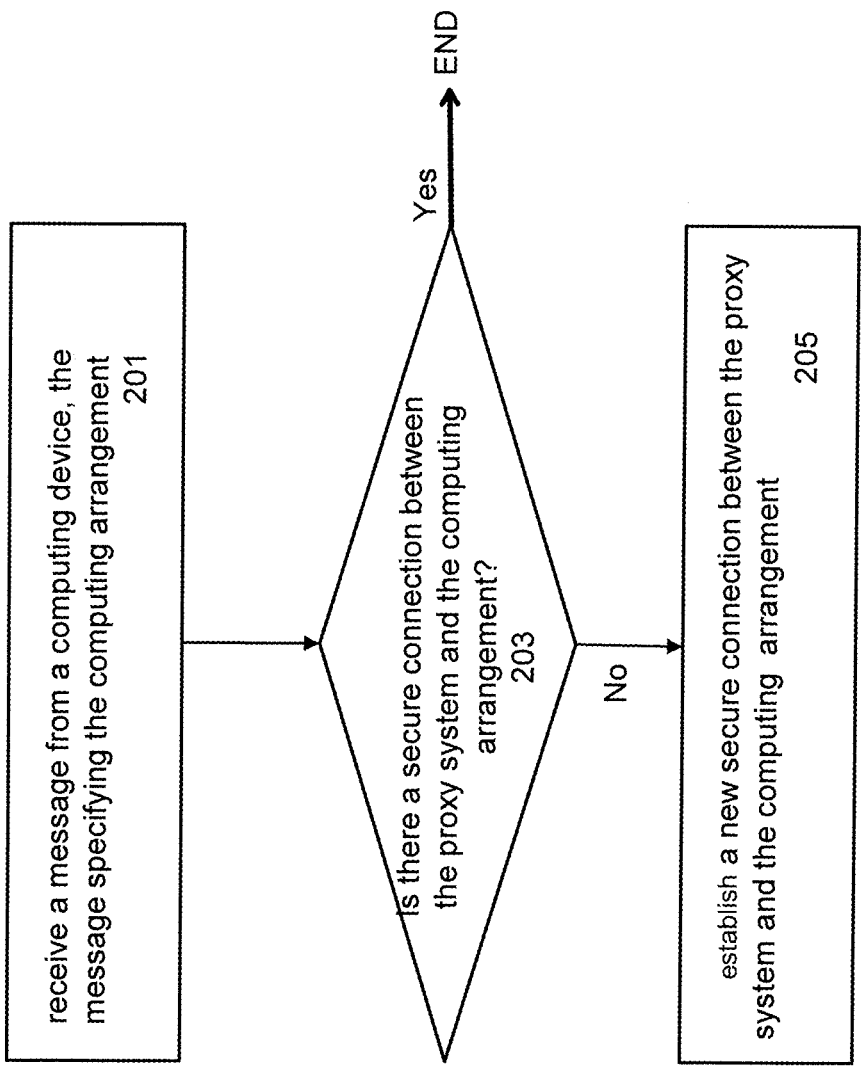
FIG. 2 is a flowchart of a method for connecting a computing device to a computing arrangement, in accordance with embodiments of the present invention.

FIG. 2 is a flowchart of a method for connecting a computing device (e.g., client system 101A) to a computing arrangement (e.g., VPN server 111A), in accordance with embodiments of the present invention.

In step 201, proxy system 103 may receive a message from the computing device 101A-N. In another example, the message may be intercepted by the proxy system 103, wherein the message is sent by the computing device 101A to a destination of the computing arrangement 111A. The message may comprise an address specifying the computing arrangement 111A. The address may for example comprise one of a network address, a hostname of the computing arrangement 111A and a URL hosted on the computing arrangement 111A. The message may be received via a first network that may be a secure network. The first network may be a local area network.

In step 203, it may be determined, based on the address, whether a secure connection between the proxy system and the computing arrangement 111A exists. The secure connection can be used for communicating between the computing device 101A and the computing arrangement 111A.

The secure connection may for example be a VPN connection 113A. The VPN manager 105 of the proxy system 103 may perform step 203, so that, the VPN manager 105 may access the VPN connector table 106 to verify existing VPN connectors 121A-N to determine whether there is a connector whose associated VPN connection includes or involves the address of the received message.

If step 203 determines that the secure connection does not exist, then a new secure connection may be established in step 205 between the proxy system 103 and the computing arrangement 111A. The secure connection establishment may for example be initiated by forwarding the message to the computing arrangement 111A-N. If step 203 determines that the secure connection exists, then the secure connection may be used instead of creating a new secure connection and the method of FIG. 2 ends. The secure connection may be a connection over a second network 109 to which the computing arrangement and the proxy system are connected. The second network may be the Internet.

For example, the VPN manager 105 may control the VPN activator to create a software container 121A for the new secure connection 113 to be created. The forwarding of the message to the computing arrangement may for example be performed by the protocol entity of the application 131A of the VPN connector 121A. For example, configuration data may be exchanged between the proxy system and the computing arrangement such that each of the proxy system 103 and computing arrangement 111A may be in possession of the configuration data; e.g., including the IP address of both proxy system 103 and computing arrangement 111A and a shared secret, such as a random number or alphanumeric string. When such configuration data is available, each of the proxy system 103 and computing arrangement 111A may perform a configuration process using such configuration data which results in the secure connection 113A being established.

In one example, the secure connection 113A exists in that the VPN connector table 106 still contains an entry and the data indicative of the secure connection 113A as being not utilized since that secure connection may not have been used for the time out period, in which case, the VPN connector of the secure connection 113A may have been deleted in order to create other containers for other active connections. Thus, in this case, the VPN manager 105 may control the VPN activator 107 to create a software container 121A for the existing secure connection 113A such that the secure connection 113A may be reused.

In addition to establishing or identifying an existing secure connection 113A, a connection 115A may be established between the computing device 101A and the proxy system 103. The connection 115A may for example be established upon receiving the message of step 201. In another example, the connection 115A may be an existing connection that is used by the computing device 101A to connect to another computing arrangement; e.g., computing arrangement 111N. The connection of the computing device 101A to the computing arrangement 111N may have been performed as described with the connection of the computing device 101A to the computing arrangement 111A (e.g., steps 201-205 may be performed for establishing or reusing the secure connection 113N). The computing device 101A may communicate with the computing arrangements 111A and 111N in parallel or in sequence; e.g., the communication to the computing arrangement 111N is first performed.

For example, for communicating data between the computing device 101A and the computing arrangement 111A, data may be sent by sent by the computing device 101A to the proxy system 103 via the connection 115A, and the proxy system 103 may forward the received data from the computing device 101A to the computing arrangement 111A via the VPN connection 113A. For communicating data between the computing arrangement 111A and the computing device 101A, data may be sent by sent by the computing arrangement 111A to the proxy system 103 via the VPN connection 113A, and the proxy system 103 may forward the received data from the computing arrangement 111A to the computing device 101A via the connection 115A.

Figure 3:
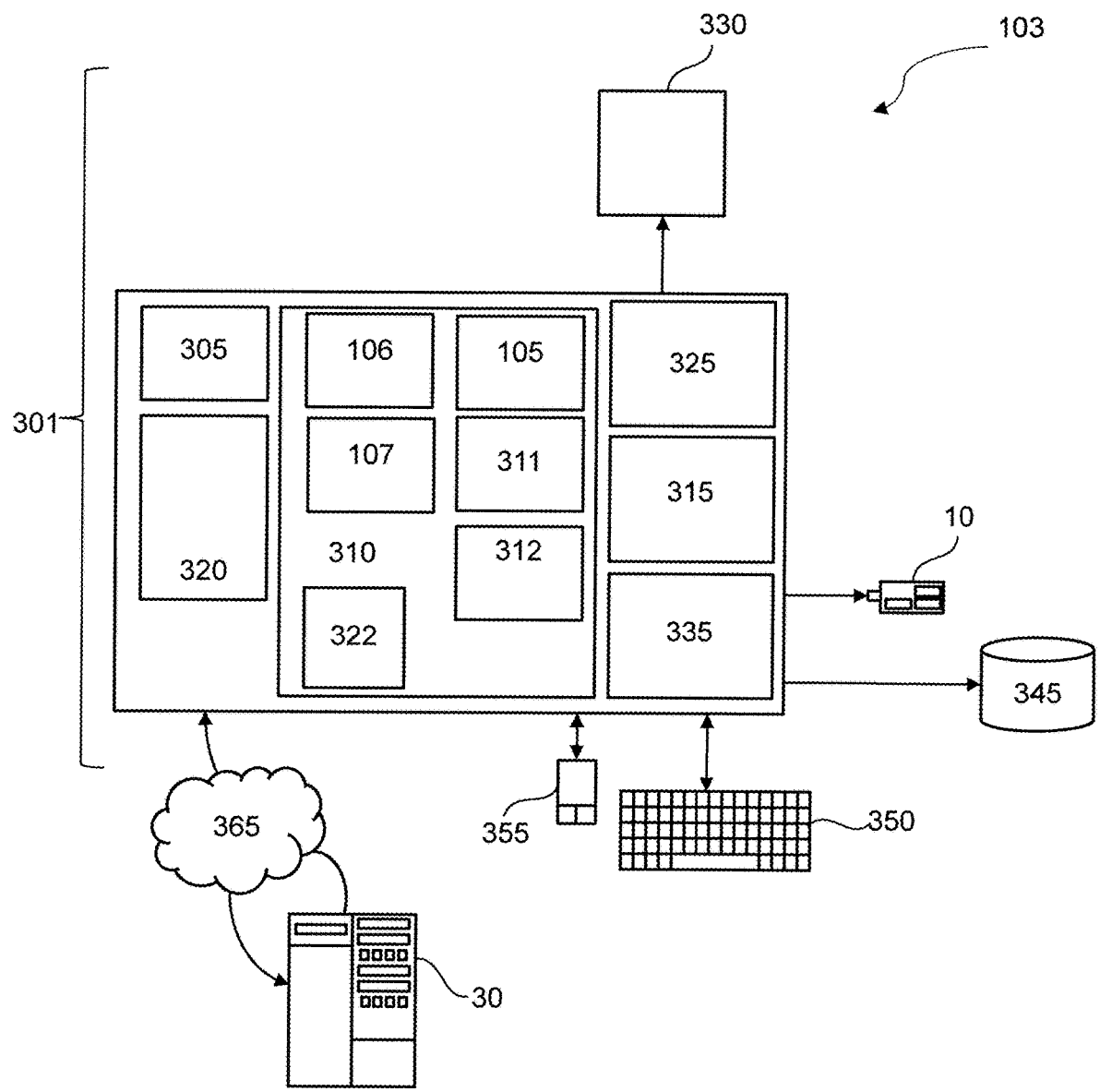
FIG. 3 represents a computerized system, suited for implementing embodiments of the present invention.

FIG. 3 represents a computerized system, suited for implementing embodiments of the present invention.

FIG. 3 depicts an example hardware implementation of proxy system 103. FIG. 3 represents a general computerized system, suited for implementing method steps as involved in embodiments of the present invention.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software, 322 (including firmware 322), hardware (processor) 305, or a combination thereof. In exemplary embodiments, the methods described herein are implemented in software, as an executable program, and is executed by a special or general-purpose digital computer, such as a personal computer, workstation, minicomputer, or mainframe computer. The most general proxy system 103 therefore comprises, or is comprised by, a general-purpose computer or computer system 301. The client system 101A-N may comprise, or be comprised by, the general-purpose computer or computer system 301. The VPN server 111A-N may comprise, or be comprised by, the general-purpose computer or computer system 301.

In exemplary embodiments, in terms of hardware architecture, as shown in FIG. 3, the computer 301 includes a processor 305, memory (e.g., main memory 310) coupled to a memory controller 315, and one or more input and/or output (I/O) devices (or peripherals) 10, 345 that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 345 may generally include any generalized cryptographic card or smart card known in the art.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, one or more processors or processing units, or generally any device for executing software instructions.

The memory 310 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM)). The memory 310 can have a distributed architecture, where various components are situated remote from one another, but can be accessed by the processor 305. The memory 310 may include one or more memories.

The software in memory 310 may include one or more separate programs, each of which comprises an ordered listing of executable instructions for implementing logical functions, notably functions involved in embodiments of this invention.

The software in memory 310 shall also typically include a suitable operating system (OS) 311. The OS 311 essentially controls the execution of other computer programs, such as the record linkage VPN manager 105. Memory 310 is shown as containing VPN manager 105 VPN connector table 106 and VPN activator 107 as described above.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 345 may include input devices, for example but not limited to a printer, a scanner, microphone, and the like. Finally, the I/O devices 10, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 345 can be any generalized cryptographic card or smart card known in the art. The system 101 can further include a display controller 325 coupled to a display 330. In exemplary embodiments, the system 101 can further include a network interface for coupling to a network 365. The network 365 can be an IP-based network for communication between the computer 301 and any external server, client and the like via a broadband connection. The network 365 transmits and receives data between the computer 301 and external systems 30, which can be involved to perform part or all of the steps of the methods discussed herein. In exemplary embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) 312. The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The methods described herein and the OS 311, in whole or in part, but typically the latter, are read by the processor 305, possibly buffered within the processor 305, and then executed.

When the systems and methods described herein are implemented in software, as is shown in FIG. 3, the methods can be stored on any computer readable hardware storage medium or storage device, such as storage 320, for use by or in connection with any computer related system or method. The storage 320 may comprise a disk storage such as HDD storage. The storage 320 may include one or more computer readable hardware storage devices.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instruction.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
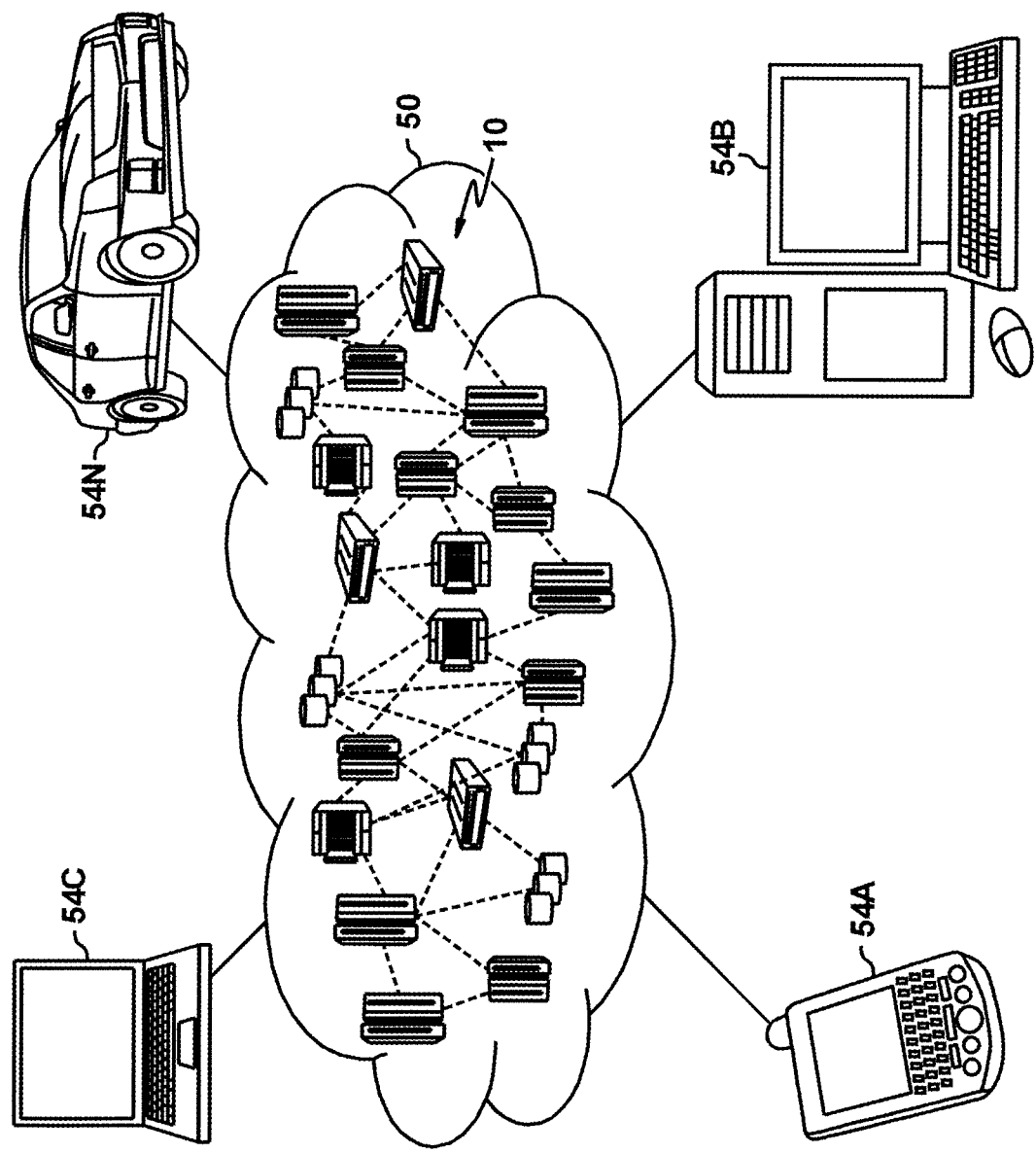
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
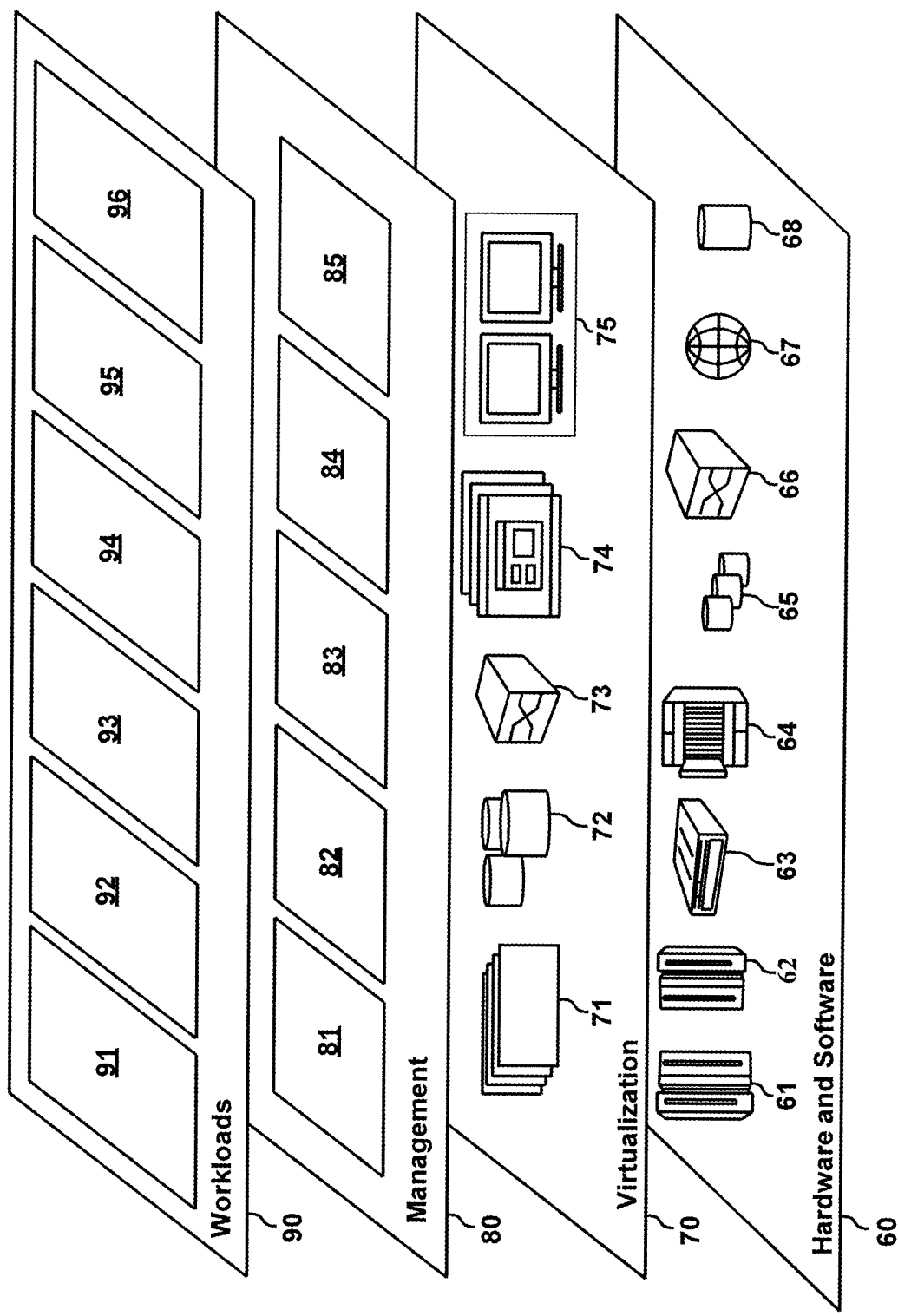
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an aggregation service 96 configured to use a software application to aggregate local parameters into aggregated parameters for use by the management server 210.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for connecting a computing device to a computing arrangement, said method comprising:

receiving, by one or more processors of a proxy system, a message from the computing device, said message comprising an address specifying the computing arrangement, said proxy system being a computer system;

determining, by the one or more processors based on the address in the message, whether or not a secure connection between the proxy system and the computing arrangement does not exist, wherein said determining determines that the secure connection does not exist, said secure connection being dedicated for secure communication between the computing device and the computing arrangement; and in response to said determining having determined that the secure connection does not exist, establishing, by the one or more processors, a new secure connection between the proxy system and the computing arrangement, wherein said establishing the new secure connection comprises instantiating a container, and initiating an establishment of the secure connection by a protocol entity deployed within the container, wherein the container is a virtual software object that encompasses all of the elements that are needed for an application to run within an operating system, which enables isolation of the container from one or more additional containers running within an operating system.

2. The method of claim 1, wherein the computing arrangement is a cloud component of a cloud infrastructure system.

3. The method of claim 1, wherein the secure connection is a Virtual Private Network (VPN) connection.

4. The method of claim 1, wherein the proxy system comprises a storage arrangement for storing authorization credentials required for establishing the secure connection, and wherein the proxy system is operable for retrieving the authorization credentials from the storage arrangement for establishing the new secure connection.

5. The method of claim 1, said proxy system being operable for retrieving authorization credentials from a remote storage arrangement for establishing the new secure connection.

6. The method of claim 1, wherein the secure connection is closed if no communication took place between the computing device and the computing arrangement during a predefined time out period.

7. The method of claim 1, wherein the message is a connection setup request destined to the computing arrangement.

8. The method of claim 1, wherein the message is an Internet Protocol (IP) packet and/or a Hypertext Transfer Protocol (HTTP) request.

9. The method of claim 1, wherein the address is an IP address or a Universal Resource Locator (URL).

10. A computer program product, comprising one or more computer readable hardware storage devices having computer readable program code stored therein, said program code containing instructions executable by one or more processors of a proxy system of a computer system to implement a method for connecting a computing device to a computing arrangement, said method comprising:

receiving, by the one or more processors, a message from the computing device, said message comprising an address specifying the computing arrangement, said proxy system being a computer system;

determining, by the one or more processors based on the address in the message, whether or not a secure connection between the proxy system and the computing arrangement does not exist, wherein said determining determines that the secure connection does not exist, said secure connection being dedicated for secure communication between the computing device and the computing arrangement; and in response to said determining having determined that the secure connection does not exist, establishing, by the one or more processors, a new secure connection between the proxy system and the computing arrangement, wherein said establishing the new secure connection comprises instantiating a container, and initiating an establishment of the secure connection by a protocol entity deployed within the container, wherein the container is a virtual software object that encompasses all of the elements that are needed for an application to run within an operating system, which enables isolation of the container from one or more additional containers running within an operating system.

11. The computer program product of claim 10, wherein the computing arrangement is a cloud component of a cloud infrastructure system.

12. The computer program product of claim 10, wherein the secure connection is a Virtual Private Network (VPN) connection.

13. The computer program product of claim 10, wherein the proxy system comprises a storage arrangement for storing authorization credentials required for establishing the secure connection, and wherein the proxy system is operable for retrieving the authorization credentials from the storage arrangement for establishing the new secure connection.

14. A computer system, comprising a proxy system, said proxy system comprising one or more processors, one or more memories, and one or more computer readable hardware storage devices, said one or more hardware storage device containing program code executable by the one or more processors via the one or more memories to implement a method for connecting a computing device to a computing arrangement, said method comprising:

receiving, by the one or more processors, a message from the computing device, said message comprising an address specifying the computing arrangement, said proxy system being a computer system;

determining, by the one or more processors based on the address in the message, whether or not a secure connection between the proxy system and the computing arrangement does not exist, wherein said determining determines that the secure connection does not exist, said secure connection being dedicated for secure communication between the computing device and the computing arrangement; and in response to said determining having determined that the secure connection does not exist, establishing, by the one or more processors, a new secure connection between the proxy system and the computing arrangement, wherein said establishing the new secure connection comprises instantiating a container, and initiating an establishment of the secure connection by a protocol entity deployed within the container, wherein the container is a virtual software object that encompasses all of the elements that are needed for an application to run within an operating system, which enables isolation of the container from one or more additional containers running within an operating system.

15. The computer system of claim 14, wherein the computing arrangement is a cloud component of a cloud infrastructure system.

16. The computer system of claim 14, wherein the secure connection is a Virtual Private Network (VPN) connection.

17. The computer system of claim 14, wherein the proxy system comprises a storage arrangement for storing authorization credentials required for establishing the secure connection, and wherein the proxy system is operable for retrieving the authorization credentials from the storage arrangement for establishing the new secure connection.

* * * * *